United States Patent
Kashihara et al.

(10) Patent No.: US 7,262,247 B2
(45) Date of Patent: Aug. 28, 2007

(54) BINDER RESIN SOLUTION COMPOSITION, COATINGS, INKS, ADHESIVES AND PRIMERS

(75) Inventors: Kenji Kashihara, Takasago (JP); Tetsuji Nishioka, Takasago (JP); Tatsuo Tsuneka, Takasago (JP); Shoji Maekawa, Takasago (JP); Isao Wada, Sodegaura (JP)

(73) Assignees: Toyo Kasei Kogyo Company Limited, Osaka (JP); Mitsui Chemicals, Inc., Tokyo (JP)

( * ) Notice: Subject to any disclaimer, the term of this patent is extended or adjusted under 35 U.S.C. 154(b) by 87 days.

(21) Appl. No.: 10/482,053

(22) PCT Filed: Jun. 26, 2002

(86) PCT No.: PCT/JP02/06377

§ 371 (c)(1),
(2), (4) Date: Dec. 29, 2003

(87) PCT Pub. No.: WO03/002658

PCT Pub. Date: Jan. 9, 2003

(65) Prior Publication Data

US 2004/0116590 A1    Jun. 17, 2004

(30) Foreign Application Priority Data

Jun. 29, 2001    (JP) .............................. 2001-199218

(51) Int. Cl.
| | |
|---|---|
| *C08L 51/04* | (2006.01) |
| *C08L 51/00* | (2006.01) |
| *C08L 75/00* | (2006.01) |
| *C08J 3/02* | (2006.01) |
| *C08K 3/20* | (2006.01) |
| *C08G 63/48* | (2006.01) |

(52) U.S. Cl. ............................. 525/65; 525/65; 525/66; 525/69; 524/507; 524/802; 524/820; 524/840; 524/501; 524/504; 524/839; 526/348.6

(58) Field of Classification Search .................. 525/65; 524/543; 526/348.6
See application file for complete search history.

(56) References Cited

U.S. PATENT DOCUMENTS

| | | | |
|---|---|---|---|
| 5,788,898 A | * | 8/1998 | Nishimura et al. ...... 264/290.2 |
| 6,277,912 B1 | * | 8/2001 | Ashihara et al. .............. 525/65 |
| 2002/0068137 A1 | * | 6/2002 | Paleari et al. .............. 428/34.9 |

FOREIGN PATENT DOCUMENTS

| | | |
|---|---|---|
| JP | 46-27489 | 8/1971 |
| JP | 50-35445 | 11/1975 |
| JP | 50-37688 | 12/1975 |
| JP | 63-36624 B2 | 7/1988 |
| JP | 63-50381 B2 | 10/1988 |
| JP | 6-306227 A | 11/1994 |
| JP | 7-18016 A | 1/1995 |
| JP | 10-168123 A | 6/1998 |
| JP | 11-315185 A | 11/1999 |
| JP | 2001-114961 A | 4/2001 |
| WO | 00/26310 A1 | 5/2000 |

* cited by examiner

*Primary Examiner*—Duane Smith
*Assistant Examiner*—Ives Wu
(74) *Attorney, Agent, or Firm*—Kubovcik & Kubovcik

(57) ABSTRACT

The present invention provides a binder resin solution composition, and a coating, ink, and adhesive containing the composition as an active ingredient, the binder resin solution composition having a solid content of 10 to 50 wt. % and comprising (a) a chlorinated polyolefin prepared by chlorinating to a chlorine content of 10 to 40 wt. % an ethylene-propylene-butene ternary random copolymer having an ethylene content of 3.0 to 3.7 mol %, 1-butene content of 2.4 to 2.8 mol %, and melting point of 129 to 133° C., and (b) an organic solvent.

14 Claims, No Drawings

BINDER RESIN SOLUTION COMPOSITION, COATINGS, INKS, ADHESIVES AND PRIMERS

TECHNICAL FIELD

The present invention relates to a binder resin composition used to protect or decorate products of polyolefin resins such as polypropylene, polyethylene, ethylene-propylene copolymers, and ethylene-propylene-diene copolymers. More particularly, the present invention relates to a binder resin solution composition that is excellent in adhesion to sheets, films, molded articles and the like made from the aforementioned polyolefin resins and in solvent resistance; has excellent low-temperature flowability; and is used for coatings, primers, printing inks, or adhesives.

BACKGROUND ART

Generally, polyolefin resins are relatively inexpensive and have noteworthy properties such as chemical resistance, water resistance, heat resistance, etc., and therefore used in a wide variety of applications for automotive parts, electronic parts, building materials, food packaging films, and the like. However, since polyolefin resins having such remarkable properties are crystalline and non-polar, it is difficult to coat or bond products made of the resins.

Weakly chlorinated polyolefins exhibiting strong adhesion to polyolefin resins have been used as binder resins to coat or bond such low-adhesion polyolefin resins. For example, Japanese Examined Patent Publication No. 27489/1971 proposes an isotactic polypropylene chlorinated to have a chlorine content of 20 to 40 wt. % as a printing ink binder resin for polypropylene films. Japanese Examined Patent Publication Nos. 35445/1975 and 37688/1975 teach propylene-ethylene copolymers chlorinated to 20 to 40 wt. % as binder resins for printing inks and adhesives used on polyolefins.

Moreover, Japanese Examined Patent Publication Nos. 50381/1988 and 36624/1988 propose, as primers or binder resins for coating polyolefin molded articles, weakly chlorinated propylene-α-olefin copolymers with a chlorine content of 5 to 50 wt. % containing a carboxylic acid and/or carboxylic anhydride.

Generally, it is desirable to keep the chlorine content as small as possible since, as the chlorine content increases, such chlorinated polyolefins exhibit reduced solvent resistance and adhesion to polyolefins. However, when the chlorine content is excessively low, properties of the polyolefin solution are impaired, thickening or gelating during storage, thereby resulting in significant deterioration in coating workability during spray coating and the like. Even when the chlorine content of the chlorinated polyolefins is maintained within a range such that coating workability during spray coating and the like does not suffer, the chlorinated polyolefin solutions exhibit impaired flowability when stored at low-temperatures, thereby greatly limiting their handling properties at low temperatures such as in winter. Although it is possible to improve low-temperature flowability by keeping the concentration of the weakly chlorinated polyolefin in the solution low, when the concentration is excessively low, problems arise such as difficult pigment dispersion in solvents upon processing into inks and coatings, increased transportation cost, etc.

To overcome such problems, Japanese Unexamined Patent Publication No. 306227/1994 proposes a binder resin solution, as a binder resin solution composition with excellent low-temperature flowability, that is obtained by dissolving a weakly chlorinated polyolefin in an alicyclic hydrocarbon and aromatic hydrocarbon mixed solvent.

However, the use of such a mixed solvent requires complex process in production, resulting in high cost. Moreover, for example, when the mixed solvent is used as a part of the primer component for coating, upon blending with a solvent-dispersed resin, its low-temperature flowability is impaired due to the change in chemical composition of the solvent. Therefore, it is hardly a fundamental solution to the aforementioned problems.

DISCLOSURE OF THE INVENTION

An object of the invention is to provide a binder resin solution composition for use in coatings, primers, printing inks, or adhesives, without impairing the low-temperature flowability and workability of weakly chlorinated polyolefins, the composition having excellent solvent resistance and outstanding adhesion to polyolefin products.

Other objects and characteristics of the present invention will become evident by the disclosure provided hereinbelow.

The inventors conducted extensive research and found that a binder resin solution composition obtained by dissolving a chlorinated polyolefin prepared by chlorinating an ethylene-propylene-butene ternary random copolymer having a specific melting point and composition structure in an organic solvent imparts excellent low-temperature flowability and workability and exhibits excellent adhesion to polyolefin products and solvent resistance. The present invention has been accomplished based on these findings.

In other words, the present invention provides a binder resin solution composition, coating, ink, adhesive, and primer as described below:

1. A binder resin solution composition having a solid content of 10 to 50 wt. % comprising (a) a chlorinated polyolefin prepared by chlorinating to a chlorine content of 10 to 40 wt. % an ethylene-propylene-butene ternary random copolymer having an ethylene content of 3.0 to 3.7 mol %, 1-butene content of 2.4 to 2.8 mol %, and melting point of 129 to 133° C., and (b) an organic solvent.

2. A binder resin solution composition having a solid content of 10 to 50 wt. % comprising (a) a carboxyl-containing chlorinated polyolefin prepared by chlorinating to a chlorine content of 10 to 40 wt. % an ethylene-propylene-butene ternary random copolymer having an ethylene content of 3.0 to 3.7 mol %, 1-butene content of 2.4 to 2.8 mol %, and melting point of 129 to 133° C. to produce a chlorinated polyolefin and graft-polymerizing with the chlorinated polyolefin 1 to 10 wt. % of at least one unsaturated carboxylic acid monomer selected from the group consisting of carboxylic acids and carboxylic acid anhydrides, and (b) an organic solvent.

3. A binder resin solution composition having a solid content of 10 to 50 wt. % comprising (a) a carboxyl-containing chlorinated polyolefin prepared by graft-polymerizing 1 to 10 wt. % of at least one unsaturated carboxylic acid monomer selected from the group consisting of carboxylic acids and carboxylic acid anhydrides with an ethylene-propylene-butene ternary random copolymer having an ethylene content of 3.0 to 3.7 mol %, 1-butene content of 2.4 to 2.8 mol %, and melting point of 129 to 133° C. to produce a carboxyl-containing polyolefin and chlorinating the carboxyl-containing polyolefin to a chlorine content of 10 to 40 wt. %, and (b) an organic solvent.

4. A coating for a polyolefin film, sheet or molded article, the coating comprising as an active ingredient the binder resin solution composition according to any of Items 1 to 3.
5. An ink for a polyolefin film, sheet or molded article, the ink comprising as an active ingredient the binder resin solution composition according to any of Items 1 to 3.
6. An adhesive for a polyolefin film, sheet or molded article, the adhesive comprising as an active ingredient the binder resin solution composition according to any of Items 1 to 3.
7. A primer for coating a polyolefin resin, the primer comprising as an active ingredient the binder resin solution composition according to Item 2 or 3.

Examples of resin components for use in the binder resin solution composition of the present invention include chlorinated polyolefins prepared by chlorinating ethylene-propylene-butene ternary random copolymers; carboxyl-containing chlorinated polyolefins prepared by graft-polymerizing unsaturated carboxylic acid monomers with chlorinated polyolefins prepared by chlorinating ethylene-propylene-butene ternary random copolymers; and carboxyl-containing chlorinated polyolefins prepared by graft-polymerizing unsaturated carboxylic acid monomers with ethylene-propylene-butene ternary random copolymers to give carboxyl-containing polyolefins and chlorinating the carboxyl-containing polyolefins.

Examples of ethylene-propylene-butene ternary random copolymers used as starting materials are polyolefins having an ethylene content of 3.0 to 3.7 mol % (preferably 3.1 to 3.6 mol %), 1-butene content of 2.4 to 2.8 mol % (preferably 2.5 to 2.7 mol %), propylene content of 93.5 to 94.6 mol % (preferably 9.3.7 to 94.4 mol %), and melting point of 129 to 133° C. (preferably 130 to 132° C.). Preferable are those having a molecular weight distribution (Mw/Mn) of 3 to 5.

Ethylene-propylene-butene ternary random copolymers usable herein can be produced according to a variety of known methods. For example, they can be produced in the presence of catalysts containing magnesium, titanium, halogen, an electron donor, and aluminum. Examples of such catalysts include solid titanium catalytic components containing magnesium, titanium, halogen, and an internal electron donor as an essential ingredient supported by an organic or inorganic carrier; stereoregular catalysts containing such solid titanium catalytic components, organo metallic compounds of metals belonging to Groups 1 to 3 of the periodic table, and external electron donors; and the like. Ethylene-propylene-butene ternary random copolymers usable herein can be produced by copolymerizing propylene and a small amount of ethylene and 1-butene in the presence of such catalysts.

The main component of the catalyst, i.e., a specific solid titanium catalytic component, to produce the ethylene-propylene-butene ternary random copolymer is preferably a product of a reaction between titanium tetrachloride and an alcohol-containing Mg compound conducted in a hydrocarbon solvent.

Examples of polymerization methods include suspension polymerization conducted in the presence of hydrocarbon solvent or propylene solvent, gas-phase polymerization, and similar methods. Among these methods, suspension polymerization in the presence of propylene solvent and gas-phase polymerization are preferable.

The chlorinated polyolefin used herein has a chlorine content of 10 to 40 wt. %. When the chlorine content is lower than 10 wt. %, solubility in solvents is impaired, and good low-temperature flowability cannot be attained. A chlorine content exceeding 40 wt. % is not preferable because adhesion to polyolefins and solvent resistance are compromised. The preferable chlorine content is 20 to 30 wt. %.

The chlorine content of the carboxyl-containing chlorinated polyolefin graft-polymerized with an unsaturated carboxylic acid monomer should also be 10 to 40 wt. %, and preferably 20 to 30 wt. %.

Graft polymerizing an unsaturated carboxylic acid monomer with an ethylene-propylene-butene ternary random copolymer can be conducted according to known methods, e.g., a polyolefin is brought to reaction by heating it in the presence of radical generator to a temperature above its melting point and fusing it (fusion method), or by dissolving a polyolefin in an organic solvent and heating and stirring it in the presence of radical generator (solution method).

The fusion method provides the advantage of easy operation and quick reaction because a Banbury mixer, kneader, extruder, or like equipment is used and the reaction is conducted at temperatures higher than the melting point up to 300° C. In the solution method, it is preferable to use toluene, xylene, or a similar aromatic solvent as a reaction solvent. A reaction temperature of 100 to 180° C. and reaction time of 1 to 5 hours causes few side reactions and provides uniform graft polymers.

Examples of radical generators usable in the reaction include di-tert-butyl perphthalate, tert-butyl hydroperoxide, dicumyl peroxide, benzoyl peroxide, tert-butyl peroxybenzoate, tert-butyl peroxypivalate, methyl-ethyl-ketone peroxide, di-tert-butyl peroxide, and like peroxides; azobisisobutyronitrile, azobisisopropionitrile, and like azonitriles; etc.

Examples of unsaturated carboxylic acid monomers usable in the reaction include maleic acid, maleic anhydride, fumaric acid, citraconic acid, citraconic anhydride, mesaconic acid, itaconic acid, itaconic anhydride, aconitic acid, aconitic anhydride, himic anhydride, etc.

The grafting ratio of the unsaturated carboxylic acid monomer is 1 to 10 wt. %. When it is less than 1 wt. %, sufficient adhesion cannot be attained since the content of polar group in the composition becomes excessively low. When it is more than 10 wt. %, gelation occurs during chlorination.

A method for graft-polymerizing an unsaturated carboxylic acid monomer with a chlorinated polyolefin produced by chlorinating an ethylene-propylene-butene ternary random copolymer can be conducted according to the solution method described above. The preferable reaction temperature is 60 to 120° C. Excessively low temperatures are not preferable since the reaction proceeds slowly, and excessively high temperatures are also not preferable because the chlorinated polyolefin decomposes. The grafting ratio of the unsaturated carboxylic acid monomer is 1 to 10 wt. %. When the grafting ratio is less than 1 wt. %, the content of polar group in the composition becomes too small, resulting in insufficient adhesion, and a grafting ratio more than 10 wt. % results in impaired properties.

Polyolefins can be readily chlorinated according to known methods. For example, a polyolefin resin (an ethylene-propylene-butene ternary random copolymer, or a carboxyl-containing polyolefin produced by grafting an unsaturated carboxylic acid monomer with such an ethylene-propylene-butene ternary random copolymer) is brought to reaction by dissolving in a chlorination solvent, and injecting chlorine gas at a temperature of 50 to 150° C., in the presence of a catalyst or under UV irradiation, under ambient or increased pressure.

Catalysts usable in the chlorination reaction include, for example, tert-butylperoxy-2-ethylhexanoate, di-tert-butyl peroxide, benzoyl peroxide, dicumyl peroxide, tert-butyl-cumyl peroxide, dilauryl peroxide, tert-butyl hydroperoxide, cyclohexanone peroxide, tert-butyl peroxybenzoate, cumene hydroperoxide, tert-butyl peroxyisobutylate, and similar peroxides; azobisisobutyronitrile, azobisisopropionitrile, and like azonitriles; etc.

Examples of solvents for use in the chlorinating reaction include halogenated solvents such as tetrachloroethylene, chloroform and like halogenated hydrocarbons. Chloroform is especially preferable.

During production of the binder resin solution composition of the present invention, the aforementioned chlorinated polyolefins may be solidified, dried, and dissolved in an organic solvent. Alternatively, after the chlorination reaction, the chlorination solvent is removed by distillation and replaced with the organic solvent.

The solid content of the binder resin solution composition is 10 to 50 wt. %. A solid content less than 10 wt. % poses problems such as difficult pigment dispersion when the solution composition is processed into inks and coatings, high transportation costs, and other problems. A solid content more than 50 wt. % is not preferable because the impaired low-temperature flowability greatly limits handling during winter low temperatures. The preferable solid content is 20 to 40 wt. %.

Toluene, xylene, or a similar aromatic organic solvent is preferable as the organic solvent used in the binder resin solution composition of the invention.

A feature of the present invention is to further improve properties of weakly chlorinated polyolefins, which have good adhesion to polyolefins. In particular, although weakly chlorinated polyolefins by nature exhibit better adhesion to polyolefins and improved solvent resistance as their chlorine content is lowered, properties of the solutions thereof are deteriorated, resulting in thickening/gelation during storage and impaired low-temperature flowability. Accordingly, coating workability during spray coating and the like is significantly deteriorated and handling properties during winter low temperatures are greatly impaired. However, a binder resin solution composition, as disclosed herein, comprising as a resin component a weakly-chlorinated polyolefin, obtained by chlorinating an ethylene-propylene-butene ternary random copolymer having an ethylene content of 3.0 to 3.7 mol %, a 1-butene content of 2.4 to 2.8 mol %, and a melting point of 129 to 133° C., has excellent solution quality and low-temperature flowability, as well as excellent solvent resistance and adhesion to polyolefins.

The binder resin solution composition of the present invention can be used as a binder composition for a coating for polyolefin films, sheets, molded articles, and the like, as well as a binder composition for inks, adhesives, etc. Furthermore, such a composition containing a carboxyl-containing chlorinated polyolefin produced by graft-polymerizing an unsaturated carboxylic acid monomer can be used as a primer for coating polyolefin bumpers.

Although the binder resin solution composition of the invention can be applied as a coating per se, it can also be used as a coating or ink by mixing with a pigment, a solvent, or other additives. While the binder resin provides a coating film with well-balanced properties, it can further be used in combination with alkyd resins, acrylic resins, polyacryl polyols, polyester resins, polyester polyols, polyether resins, polyether polyols, polyurethane resins, chlorinated polyolefins, etc., as required.

The binder resin solution composition of the invention, because it achieves excellent solvent resistance and adhesion to polyolefin products without impairing the low-temperature flowability and workability of weakly chlorinated polyolefins, can be used as a binder resin solution composition for coatings, primers, printing inks, or adhesives.

BEST MODE FOR CARRYING OUT THE INVENTION

Examples are given below to illustrate the invention in more detail, but the scope of the invention is not limited to these examples.

EXAMPLE 1

An ethylene-propylene-butene ternary random copolymer (280 g) having an ethylene content of 3.4 mol %, 1-butene content of 2.7 mol %, Mw/Mn of 5, and melting point of 131° C. and chloroform (2520 g) were introduced into an autoclave equipped with a stirrer. After charging it with nitrogen for about 5 minutes, the autoclave was heated to 110° C. to sufficiently fuse the polyolefin resin. Subsequently, 1.4 g of tert-butylperoxy-2-ethylhexanoate was added and chlorine gas was injected to acquire 3 reaction solutions each having a different chlorine content. The reaction solvent, i.e., chloroform, was distilled off under reduced pressure, and toluene was added to dissolve, thereby producing toluene solutions of chlorinated polyolefin having a chlorine content of 15 wt. %, 20, wt. %, and 25 wt. %, respectively, and a solid content of 20 wt. % each.

COMPARATIVE EXAMPLE 1

An isotactic polypropylene having a meso pentad fraction (mmmm) of 0.95 and melt flow rate (MFR) of 20 was chlorinated as in Example 1 to obtain toluene solutions of chlorinated polypropylene having a chlorine content of 15 wt. %, 20 wt. %, and 25 wt. %, respectively, and a solid content of 20 wt. % each.

COMPARATIVE EXAMPLE 2

A propylene-ethylene random copolymer having an ethylene content of 3.9 mol % and MFR of 12 was chlorinated as in Example 1 to obtain toluene solutions of chlorinated polyolefin having a chlorine content of 15 wt. %, 20 wt. %, and 25 wt. %, respectively, and a solid content of 20 wt. % each.

COMPARATIVE EXAMPLE 3

A propylene-ethylene-butene random copolymer having an ethylene content of 4.6 mol %, 1-butene content of 2.2 mol % and MFR of 8 was chlorinated as in Example 1 to obtain toluene solutions of chlorinated polyolefin having a chlorine content of 15 wt. %, 20 wt. %, and 25 wt. %, respectively, and a solid content of 20 wt. % each.

EXAMPLE 2

Graft reaction was conducted over 5 hours by introducing 280 g of an ethylene-propylene-butene ternary random copolymer having an ethylene content of 3.4 mol %, 1-butene content of 2.7 mol %, Mw/Mn of 5, and melting point of 131° C.; 16.8 g of maleic anhydride; 5.6 g of di-tert-butyl peroxide; and 420 g of toluene into an autoclave equipped with a stirrer, charging it with nitrogen for about 5 minutes, and heating and stirring at 140° C. After the reaction, the reaction solution was introduced into an excess of methyl ethyl ketone to precipitate the resin therefrom. The resin thus obtained was further washed with methyl ethyl ketone several times to remove unreacted maleic anhydride. After drying under reduced pressure, the thus-obtained maleic anhydride-modified polyolefin was chlorinated as in Example 1 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

COMPARATIVE EXAMPLE 4

An isotactic polypropylene having a meso pentad fraction (mmmm) of 0.95 and MFR of 90 was subjected to reaction according to the method described in Example 2 to obtain toluene solutions of maleic anhydride-modified chlorinated polypropylene having a chlorine content of 10 wt. %, 15 wt. %, 20 wt. %, and 25 wt. %, respectively, and a solid content of 20 wt. % each.

COMPARATIVE EXAMPLE 5

A propylene-ethylene random copolymer having an ethylene content of 5.9 mol % and MFR of 12 was brought to reaction as in Example 2 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

COMPARATIVE EXAMPLE 6

A propylene-ethylene-butene random copolymer having an ethylene content of 4.6 mol %, 1-butene content of 2.2 mol %, and MFR of 8 was reacted as in Example 2 to obtain toluene solutions of maleic anhydride-modified chlorinated polyolefin having a chlorine content of 10 wt. %, 15 wt. %, 20 wt. %, and 25 wt. %, respectively, and a solid content of 20 wt. % each.

EXAMPLE 3

An ethylene-propylene-butene ternary random copolymer having an ethylene content of 3.4 mol %, 1-butene content of 2.7 mol %, Mw/Mn of 5, and melting point of 131° C. was chlorinated as in Example 1 to obtain toluene solutions of chlorinated polyolefin having a chlorine content of 10 wt. %, 15 wt. %, 20 wt. %, and 25 wt. %, respectively, and a solid content of 20 wt. % each. These toluene solutions of chlorinated polyolefin (350 g each) were introduced into three-neck flasks equipped with a stirrer, dropping funnel, thermometer, and refluxer. Maleic anhydride (1 g) was introduced into each flask. After heating the reaction system to 80° C. in an oil bath maintained at a specific temperature, 0.5 g of benzoyl peroxide diluted with 5 ml of toluene was added dropwise via the dropping funnel over a period of about 10 minutes. After dropwise addition, reaction was carried out for 5 hours by stirring while maintaining the reaction system at 80° C. After reaction, the reaction solutions were cooled and treated with a small amount of toluene, thereby yielding toluene solutions of maleic anhydride-modified chlorinated polyolefin each having a solid content of 20 wt. %.

Chlorinated polyolefin solutions obtained in Examples 1 to 3 and Comparative Examples 1 to 6 were investigated for the following properties:

(1) Low-Temperature Flowability

Tables 1 and 2 show a property (low-temperature flowability) of the chlorinated polyolefin solutions obtained in Examples 1 to 3 and Comparative Examples 1 to 6 after storing each chlorinated polyolefin solution for 10 days in the air at 5° C., −5° C., or −10° C., wherein A means "flowable" and B refers to "not flowable (gelated)".

(2) Gasoline Resistance

The viscosity of the chlorinated polyolefin solutions obtained in Examples 1 to 3 and Comparative Examples 1 to 6 was adjusted by toluene so that the drain time using a Ford cup #4 was 12 sec/20° C. These solutions were spray-coated onto polypropylene boards (produced by press-molding SB-E3 manufactured by Mitsui Chemicals, Inc., according to known method; 100 mm×50 mm; thickness: 2 mm) washed with isopropyl alcohol, and dried at 80° C. for 10 minutes. A two-component urethane coating was further spray-coated thereon in an amount of 50 to 60 g/m$^2$, and the boards were dried for about 10 minutes at room temperature and for 45 minutes at 80° C. Testing was conducted on the polypropylene boards after being left for 24 hours at room temperature. The coated polypropylene boards were scratched through to the underlying board surface, and immersed for 2 hours in conventional unleaded gasoline maintained at 20° C., after which the condition of the coatings was examined. Results are shown in Tables 1 and 2.

(3) Interlaminar Adhesion

Polypropylene boards coated as in (2) above using the maleic anhydride-modified chlorinated polyolefin solutions obtained in Examples 2 and 3 and Comparative Examples 4 to 6 were provided with a grid pattern of hundred 1-mm squares that reach the underlying board surface. An adhesive cellophane tape was placed on the grid, the tape was peeled perpendicular to the coated surface, and the number of squares that were not peeled away with the tape was counted. Table 2 shows the results.

(4) Interlaminar Adhesion After Immersion in Warm Water

Polypropylene boards coated as in (2) above using the maleic anhydride-modified chlorinated polyolefin solutions obtained in Examples 2 and 3 and Comparative Examples 4 to 6 were immersed in warm water maintained at 40° C. for 240 hours and subjected to the same examination as in (3) above. Table 2 shows the results.

(5) Gasohol Resistance

Polypropylene boards coated as in (2) above using the maleic anhydride-modified chlorinated polyolefin solutions obtained in Examples 2 and 3 and Comparative Examples 4 to 6 were immersed in gasohol (conventional unleaded gasoline: ethanol=90:10 (weight ratio)) maintained at 20° C. for 120 minutes, and the condition of the coatings was examined. Table 2 shows the results.

TABLE 1

| | Chlorine content (Wt. %) | Low-temperature flowability | | | Gasoline resistance |
|---|---|---|---|---|---|
| | | 5° C. | −5° C. | −10° C. | |
| Example 1 | 15 | A | B | B | No peeling |
| | 20 | A | A | B | No peeling |
| | 25 | A | A | A | No peeling |
| Comparative Example 1 | 15 | B | B | B | No peeling |
| | 20 | B | B | B | No peeling |
| | 25 | A | B | B | Peeling |

TABLE 1-continued

|  | Chlorine content (Wt. %) | Low-temperature flowability | | | Gasoline resistance |
|---|---|---|---|---|---|
|  |  | 5° C. | −5° C. | −10° C. |  |
| Comparative Example 2 | 15 | B | B | B | No peeling |
|  | 20 | A | B | B | No peeling |
|  | 25 | A | A | B | Peeling |
| Comparative Example 3 | 15 | B | B | B | No peeling |
|  | 20 | A | B | B | No peeling |
|  | 25 | A | A | B | Peeling |

Analysis of the Results Provided in Table 1

In Example 1, an ethylene-propylene-butene ternary random copolymer having an ethylene content of 3.4 mol %, 1-butene content of 2.7 mol %, Mw/Mn of 5, and melting point of 131° C. was chlorinated and dissolved in an organic solvent. In Comparative Examples 1, 2 and 3, chlorinated polyolefins were dissolved in an organic solvent. The solution of Example 1 is clearly superior to those of Comparative Examples 1, 2 and 3 in low-temperature flowability. Moreover, the polymer of Example 1 is also superior in gasoline resistance.

TABLE 2

|  | Chlorine content (Wt. %) | Low-temperature flowability | | | Interlaminar adhesion | Interlaminar adhesion after immersion in warm water | Gasoline resistance | Gasohol resistance |
|---|---|---|---|---|---|---|---|---|
|  |  | 5° C. | −5° C. | −10° C. |  |  |  |  |
| Ex. 2 | 10 | A | B | B | 100 | 100 | No peeling | No peeling |
|  | 15 | A | B | B | 100 | 100 | No peeling | No peeling |
|  | 20 | A | A | A | 100 | 100 | No peeling | No peeling |
|  | 25 | A | A | A | 90 | 90 | No peeling | No peeling |
| Ex. 3 | 10 | A | B | B | 100 | 100 | No peeling | No peeling |
|  | 15 | A | B | B | 100 | 100 | No peeling | No peeling |
|  | 20 | A | A | A | 100 | 100 | No peeling | No peeling |
|  | 25 | A | A | A | 90 | 90 | No peeling | No peeling |
| Comp. Ex. 4 | 10 | B | B | B | 100 | 100 | No peeling | No peeling |
|  | 15 | B | B | B | 80 | 80 | No peeling | No peeling |
|  | 20 | B | B | B | 75 | 75 | No peeling | No peeling |
|  | 25 | A | A | B | 50 | 60 | Peeling | Peeling |
| Comp. Ex. 5 | 10 | B | B | B | 100 | 100 | No peeling | No peeling |
|  | 15 | B | B | B | 100 | 100 | No peeling | No peeling |
|  | 20 | A | B | B | 100 | 100 | No peeling | No peeling |
|  | 25 | A | A | A | 75 | 75 | Peeling | Peeling |
| Comp. Ex. 6 | 10 | B | B | B | 100 | 100 | No peeling | No peeling |
|  | 15 | B | B | B | 100 | 100 | No peeling | No peeling |
|  | 20 | A | B | B | 100 | 100 | No peeling | No peeling |
|  | 25 | A | A | A | 75 | 70 | Peeling | Peeling |

Analysis of the Results Provided in Table 2

In Example 2, an ethylene-propylene-butene ternary random copolymer having an ethylene content of 3.4 mol %, 1-butene content of 2.7 mol %, Mw/Mn of 5, and melting point of 131° C. was modified by maleic anhydride and then chlorinated, followed by being dissolved in an organic solvent. In Example 3, an ethylene-propylene-butene ternary random copolymer as used in Example 2 was chlorinated and then modified by maleic anhydride, followed by being dissolved in an organic solvent. In Comparative Examples 4, 5 and 6, polyolefins graft-modified with maleic anhydride were chlorinated and dissolved in an organic solvent. In spite of their better low-temperature flowability, the polymers used in Examples 2 and 3 are also superior to those used in Comparative Examples 4, 5 and 6 in coating film property. Therefore, the polymers of Examples 2 and 3 can be considered as unprecedented polymers combining outstanding low-temperature flowability and excellent coating film properties.

The invention claimed is:

1. A binder resin solution composition having a solid content of 10 to 50 wt. % comprising (a) a chlorinated polyolefin prepared by chlorinating to a chlorine content of 25 to 30 wt. % an ethylene-propylene-butene ternary random copolymer having an ethylene content of 3.0 to 3.7 mol %, 1-butene content of 2.4 to 2.8 mol %, and melting point of 129 to 133° C., and (b) an organic solvent.

2. A binder resin solution composition having a solid content of 10 to 50 wt. % comprising (a) a carboxyl-containing chlorinated polyolefin prepared by chlorinating to a chlorine content of 20 to 30 wt. % an ethylene-propylene-butene ternary random copolymer having an ethylene content of 3.0 to 3.7 mol %, 1-butene content of 2.4 to 2.8 mol %, and melting point of 129 to 133° C. to produce a chlorinated polyolefin and graft-polymerizing with the chlorinated polyolefin 1 to 10 wt. % of at least one unsaturated carboxylic acid monomer selected from the group consisting of carboxylic acids and carboxylic acid anhydrides, and (b) an organic solvent.

3. A binder resin solution composition having a solid content of 10 to 50 wt. % comprising (a) a carboxyl-containing chlorinated polyolefin prepared by graft-polymerizing 1 to 10 wt. % of at least one unsaturated carboxylic acid monomer selected from the group consisting of carboxylic acids and carboxylic acid anhydrides with an ethylene-propylene-butene ternary random copolymer having an ethylene content of 3.0 to 3.7 mol %, 1-butene content of 2.4 to 2.8 mol %, and melting point of 129 to 133° C. to produce a carboxyl-containing polyolefin and chlorinating the carboxyl containing polyolefin to a chlorine content of 20 to 30 wt. %, and (b) an organic solvent.

4. A coating for a polyolefin film, sheet or molded article, the coating comprising as an active ingredient the binder resin solution composition according to claim 1.

5. A coating for a polyolefin film, sheet or molded article, the coating comprising as an active ingredient the binder resin solution composition according to claim 2.

6. A coating for a polyolefin film, sheet or molded article, the coating comprising as an active ingredient the binder resin solution composition according to claim 3.

7. An ink for a polyolefin film, sheet or molded article, the ink comprising as an active ingredient the binder resin solution composition according to claim 1.

8. An ink for a polyolefin film, sheet or molded article, the ink comprising as an active ingredient the binder resin solution composition according to claim 2.

9. An ink for a polyolefin film, sheet or molded article, the ink comprising as an active ingredient the binder resin solution composition according to claim 3.

10. An adhesive for a polyolefin film, sheet or molded article, the adhesive comprising as an active ingredient the binder resin solution composition according to claim 1.

11. An adhesive for a polyolefin film, sheet or molded article, the adhesive comprising as an active ingredient the binder resin solution composition according to claim 2.

12. An adhesive for a polyolefin film, sheet or molded article, the adhesive comprising as an active ingredient the binder resin solution composition according to claim 3.

13. A primer for coating a polyolefin resin, the primer comprising as an active ingredient the binder resin solution composition according to claim 2.

14. A primer for coating a polyolefin resin, the primer comprising as an active ingredient the binder resin solution composition according to claim 3.

* * * * *